United States Patent Office 3,179,730
Patented Apr. 20, 1965

3,179,730
METHOD OF MANUFACTURE OF LAYERED,
CEMENTITIOUS, COLORED ARTICLES
Sauveur Ingrassia, 32 Rue d'Arles, Tunis, Tunisia
No Drawing. Filed Nov. 25, 1960, Ser. No. 71,435
3 Claims. (Cl. 264—245)

The present invention relates to a process of manufacturing prefabricated elements the basic substance of which is cement, and compounds of these prefabricated elements used to build up walls, partitions, floors, ceilings, panelling or the like, in one or several pieces, such prefabricated elements could be decorated on one or several sides, could be matte or crystalline-looking like a mirror, and could, on the part constituting its thickness, show internal or external more or less deep hollows.

According to the present invention the element is produced by casting two mortars in superposed layers in inert material non-conductor of electric current and appropriate shape, which layers have, optionally, one or several polished and/or matte and/or carved and/or relief surfaces.

One of these mortars, constituting the decorative surface of the element, is poured first and makes up a first layer in contact with the polished, matte, carved and/or relief surfaces of the moulds.

The said mortar can be constituted by the natural colors of which it is made up or be tinted in various ways with dyes, giving to it a monochromic or polychromic impression.

According to the invention, the said mortar is composed of:

Aluminous cement.
Aggregates such as chalky or silica sands or any other similar aggregates.
A solution composed of water and an adequate quantity of ammonia not giving a reaction opposite to that indicated in the example cited below.
An aqueous solution based on silicon resins.
Anionic dyes.

The number of colors as well as the blendings are to be chosen by the user.

The preferred proportions of the above-mentioned various elements are specified in the example cited below.

The second mortar is poured onto the first one and so forms a second layer constituting the loading (or charge) the thickness of which may vary according to the final utilisation of the element.

According to the invention this second mortar is composed of:

Aluminous cement.
Calcareous or silica aggregates, or similar types, the preferred proportions of which are given in the example cited below.

The two mortars mentioned above are poured into properly shaped moulds to which it is possible, if so desired, to adapt metallic or other elements of appropriate forms, in such a way as to be able to obtain on the formed element more or less deep internal or external hollows on the part that constitutes the thickness formed by the second mortar.

The said element can also be constituted by only one of the above described mortars and present one or several sides decorated or not, the said sides being either matte or of a crystalline appearance like a mirror, and, in the part constituting its thickness, can optionally have internal or external more or less deep hollows.

According to the manufacturing process of the above described mortars there are obtained prefabricated elements that may be used as revetments or decorative elements for walls or others.

In a building, they can, by proper assemblage of one or several pieces, make up a wall, a partition, a floor, or a ceiling which, on their main front sides, can show surfaces colored or not colored, matte or of a crystalline appearance like a mirror.

The internal or external hollows that can optionally be in the part of the elements constituting its thickness give them a relatively low weight that make its handling easier without depriving them of the resistance necessary for utilization.

Besides, the facing of these elements has the characteristics of resisting, without any deterioration or alteration, changes in heat and humidity and also resisting any inclemencies of weather.

Its rational conception and the very short time needed for its manufatcure allow for the element made up according to the invention to find a wide application in the building up of prefabricated houses.

The following example is illustrative of the present invention and is in no way intended to be limitative. Unless otherwise indicated, all the parts and percentages are expressed in weight.

*Example.*—To half a liter of ammonia 22 degrees Baumé is added half a liter of pure water mixed with 60 grams of anionic dye (e.g. commercially available "Viscofil G.L.") and with 20 grams of silicon resin (e.g. commercially available "Silrain") as aqueous solution.

With this solution we mix 1,000 grams of a compound prepared with 80% of aluminous cement (e.g. commercially available "Secard 250") and 20% of calcium carbonate in powder form.

The above elements so mixed are poured into moulds in inert plastic material showing internal surfaces partly polished, matte, in relief or carved.

The above-mentioned quantities allow to obtain a colored surface of about one square meter.

As soon as the mixture is poured into the moulds, there can be observed a reaction which may be compared to a slight effervescence during the course of which the particles contained in the said mixture project themselves and are fixed onto the walls of the moulds, thus forming a compact and homogeneous stratification.

That reaction lasts about thirty minutes and, just following it, a surplus of liquid without any reaction is formed above the colored stratification so obtained.

This surplus liquid is poured out, and, above the obtained stratification inside the moulds, a plastic mortar composed of two kilograms of cement (e.g. commercially available) "Fondu Lafarge" type and of three kilograms of calcareous sand is poured in. With this quantity of mortar, elements totaling six millimeters in thickness have been obtained for a surface of one square meter.

The moulds so filled are left during about 24 hours to allow for the components to harden and to be completely dry for the withdrawing from the mould.

The elements so obtained present, when withdrawn, a homogeneously colored and very compact surface of about one millimeter of thickness that have reproduced all the structures of the mould, and the internal walls of which are polished, matte, carved and in relief according as the internal wall of the mould show parts respectively matte, polished, in relief and carved, the said structures being stratified onto a non-colored mortar that is five millimeters thick.

In variants of the above example, the composition aluminous cement-calcium carbonate destined for the colored stratification is mixed with a smaller or greater quantity of solution ammoniac-dies-silicon resins prepared in the same proportions as those indicated in the above example.

It is thus understood that the mixture poured into the moulds is either undeformed, plastic, or more or less liquid.

In these different cases the effect sought for the stratification has not changed. The reaction is more visible in case the composition is more diluted in the solution. The reaction is less and less visible as the solution is less and less diluted.

The best conditions for obtaining a colored stratification in all cases of solution indicated above are worked out by applying a maximum of 1 kilogram 300 grams of the composition aluminous cement-calcium carbonate for each square meter of surface to be stratified.

As a matter of course, the invention is not at all limited to the aforementioned example since the proportions are subject to wide variation within the scope of the invention.

I claim:
1. A method for manufacturing a prefabricated building element, comprising
    (a) mixing 1000 parts by volume of an aqueous ammonia solution which is itself an admixture of equal parts by volume of water and ammonia of 22° Baumé, 60 parts by weight of anionic dye and 20 parts by weight of a silicone resin in the form of an aqueous solution thereof,
    (b) admixing with the mixture obtained by (a), 1000 parts by weight of a composition consisting of 80% aluminous cement and 20% calcium carbonate in powder form;
    (c) pouring the resulting composition into a mold of electrically neutral plastic material;
    (d) allowing the mixture in the mold to settle until an ensuing reaction of the mixture has terminated and a supernatant liquid has separated from a colored stratum;
    (e) removing the supernatant liquid;
    (f) pouring on to the colored stratum in the mold a plastic mortar consisting of 2000 parts by weight of cement and 3000 parts by weight of calcareous sand; and
    (g) allowing the resulting composite element to harden, the relationship between parts by volume and parts by weight in the foregoing being the same as that between milliliters and grams.

2. A method as described in claim 1, wherein the mixture in the mold is caused to settle in accordance with step (d) in about thirty minutes.

3. A method as described in claim 1, wherein the hardening step lasts for about 24 hours.

References Cited by the Examiner
UNITED STATES PATENTS

| | | | |
|---|---|---|---|
| 1,556,038 | 10/25 | Seailles et al. | 18—60 |
| 1,600,514 | 9/26 | Seailles et al. | 25—122 |
| 1,638,108 | 8/27 | Thomas | 18—60 |
| 1,789,197 | 1/31 | Seailles et al. | 25—122 |
| 2,339,163 | 1/44 | Friedlaender et al. | 106—104 |
| 2,574,843 | 11/51 | Randall et al. | 106—104 |

ALEXANDER H. BRODMERKEL, *Primary Examiner.*

MICHAEL V. BRINDISI, ROBERT F. WHITE, *Examiners.*